(12) United States Patent
Takeuchi

(10) Patent No.: US 7,965,935 B2
(45) Date of Patent: Jun. 21, 2011

(54) CONTROL DEVICE AND METHOD FOR CAMERA UNIT AND PROGRAM FOR IMPLEMENTING THE CONTROL METHOD

(75) Inventor: Kengo Takeuchi, Yokohama (JP)

(73) Assignee: Canon Kabushiki Kaisha (JP)

( * ) Notice: Subject to any disclaimer, the term of this patent is extended or adjusted under 35 U.S.C. 154(b) by 240 days.

(21) Appl. No.: 12/142,033

(22) Filed: Jun. 19, 2008

(65) Prior Publication Data
US 2009/0010634 A1    Jan. 8, 2009

(30) Foreign Application Priority Data

Jul. 5, 2007   (JP) .................................. 2007-177632

(51) Int. Cl.
*G03B 17/00* (2006.01)
(52) U.S. Cl. .............................. 396/76; 396/85; 396/128
(58) Field of Classification Search .................. 396/128, 396/72, 85, 76; 348/211.6, 211.9
See application file for complete search history.

(56) References Cited

U.S. PATENT DOCUMENTS

| 7,593,041 | B2 * | 9/2009 | Novak .................. 348/211.9 |
| 2002/0051302 | A1 * | 5/2002 | Terada ..................... 359/699 |
| 2005/0157180 | A1 * | 7/2005 | Takahashi et al. ....... 348/207.99 |
| 2005/0190972 | A1 | 9/2005 | Thomas et al. |
| 2005/0196070 | A1 * | 9/2005 | Takakura et al. ............. 382/284 |
| 2006/0062557 | A1 * | 3/2006 | Imada ............................ 396/55 |
| 2007/0098381 | A1 * | 5/2007 | Oshima .......................... 396/52 |
| 2008/0094480 | A1 * | 4/2008 | Swarr et al. ............. 348/211.99 |
| 2008/0111891 | A1 * | 5/2008 | Kurita et al. ............. 348/211.99 |

FOREIGN PATENT DOCUMENTS
JP    2003-98576 A    4/2003

OTHER PUBLICATIONS

Notification of First Office Action issued in corresponding Chinese Patent Application No. 200810108065.2 dated Mar. 11, 2010.

\* cited by examiner

*Primary Examiner* — Clayton E Laballe
*Assistant Examiner* — Linda B Smith
(74) *Attorney, Agent, or Firm* — Rossi, Kimms & McDowell LLP

(57) ABSTRACT

A camera unit which is capable of coping with both a case where it is largely displaced from a preset position and a case where it is slightly displaced from the same, and makes it possible to enhance accuracy and reliability in displacement correction. A zoom/focus control circuit and a pan/tilt control circuit drive the camera unit. A memory stores preset information indicative of a shooting position and a focal length of the camera unit. A correction image memory stores correction images shot at different focal lengths at the shooting position. An image comparison circuit compares between an image shot by the camera unit at the shooting position and the stored correction images, and calculates a displacement amount. A CPU corrects the driving amount of the pan/tilt control circuit based on the calculated displacement amount.

7 Claims, 7 Drawing Sheets

FIG. 4A

| PRESET No. | CAMERA POSITION | | | PRESET-POSITION CORRECTION IMAGE | MATCHING AREA |
|---|---|---|---|---|---|
| | PAN (ANGLE) -170~+170 | TILT (ANGLE) -30~+90 | ZOOM (Max ×20) | | |
| 1 | 60 | 12 | ×2 | IM1_p, IM1_w, IM1_t | p(13) w(12) t(13) |
| 2 | 40 | -15 | ×16 | IM2_p, IM2_w, IM2_t | p(11) w(12) t(14) |
| 3 | ... | ... | ... | ... | ... |
| ... | ... | ... | ... | ... | ... |

FIG. 4B

| PRESET No. | CAMERA POSITION | | | PRESET-POSITION CORRECTION IMAGE | MATCHING AREA |
|---|---|---|---|---|---|
| | PAN (ANGLE) -170~+170 | TILT (ANGLE) -30~+90 | ZOOM (Max ×20) | | |
| 1 | 60 | 12 | ×2 | IM1_p, IM1_w | p(13) w(12) |
| 2 | 40 | -15 | ×16 | IM2_p, IM2_t | p(11) t(14) |
| 3 | -20 | 3 | ×8 | IM3_p, IM3_w, IM3_t | p(11) w(12) t(14) |
| 4 | ... | ... | ... | ... | ... |
| ... | ... | ... | ... | ... | ... |

FIG. 4C

| PRESET No. | CAMERA POSITION | | | PRESET-POSITION CORRECTION IMAGE | MATCHING AREA |
|---|---|---|---|---|---|
| | PAN (ANGLE) -170~+170 | TILT (ANGLE) -30~+90 | ZOOM (Max ×20) | | |
| 1 | 60 | 12 | ×2 | IM1_p, IM1_w | p(13) w(12) |
| 2 | 40 | -15 | ×16 | IM2_p, IM2_t | p(11) t(14) |
| 3 | -20 | 3 | ×8 | IM3_p, IM3_w | p(14) t(13) |
| 4 | -50 | 30 | ×18 | IM4_p, IM4_t | p(13) t(15) |
| ... | ... | ... | ... | ... | ... |

CONTROL DEVICE AND METHOD FOR CAMERA UNIT AND PROGRAM FOR IMPLEMENTING THE CONTROL METHOD

BACKGROUND OF THE INVENTION

1. Field of the Invention

The present invention relates to a control device for a camera unit, and more particularly to a control device for a camera unit, such as a monitoring camera, which is configured to correct a displacement of a preset position, a method of controlling the camera unit, and a program for implementing the control method.

2. Description of the Related Art

Conventionally, there has been known a technique of supporting a camera by an electrically-driven panhead which is capable of performing a pan/tilt operation, and remotely controlling the pan/tilt operation of the electrically-driven panhead, and the focusing, zooming, and like operations of the camera, using control signals from a controller. This technique is applied e.g. to a monitoring camera system. Further, there has been known a function of storing preset positions, including pan/tilt positions, zooming positions, focus positions, in advance, in a memory of a camera, and automatically reproducing one of the preset positions stored in the memory, simply by performing an associated button operation. However, a zoom camera with a high magnification capability suffers from the problem that a preset position is displaced due to an insufficient stopping accuracy of the pan/tilt operation during zooming.

To solve this problem, there has been disclosed a technique in which when registering preset positions, an image (registered-position image) shot when the camera is in each preset position is stored together with information on the preset position (see e.g. Japanese Patent Laid-Open Publication No. 2003-098576). In this technique, when recalling one of the preset positions of the camera, an image (recalled-position image) captured when the camera is in the recalled position and the registered-position image are subjected to image processing to detect an amount of image displacement. Then, the driving of the panhead is controlled based on the detected amount of image displacement such that the camera is moved in the direction of reducing the displacement, whereby the stopping accuracy when recalling the preset position is improved.

In the technique disclosed in Japanese Patent Laid-Open Publication No. 2003-098576, however, if the recalled position image suffers a large amount of displacement from the registered-position image occurs due to an external force applied to the camera by an earthquake or by a contact with a human, it is impossible to correct the displacement of the preset position. Further, it is impossible to correct a displacement of the preset position with a higher accuracy than an accuracy with which the registered-position image is set.

SUMMARY OF THE INVENTION

The present invention provides a control device for a camera unit which is capable of coping with both a case where the camera unit is largely displaced from a preset position and a case where the camera unit is slightly displaced from the preset position, and makes it possible to enhance accuracy and reliability in displacement correction, a method of controlling the camera unit, and a program for implementing the control method.

In a first aspect of the present invention, there is provided a control device connected to a camera unit comprising a storage control unit configured to cause a shooting position of the camera unit and a plurality of correction images different in focal length from each other which are obtained by a plurality of times of shooting, respectively, at the shooting position of the camera unit to be stored in association with each other in a storage unit, a comparison unit configured to compare a shot image newly shot at the shooting position and the plurality of correction images, and a correction unit configured to correct a displacement of the camera unit with respect to the shooting position according to a result of comparison by the comparison unit.

With the arrangement of the first aspect of the present invention, there are stored correction images shot at respective different focal lengths in each of stored preset positions of the camera unit, so that the camera unit can cope with both a case where it is largely displaced from a preset position and a case where it is slightly displaced from the preset position, which makes it possible to enhance accuracy and reliability in displacement correction.

In a second aspect of the present invention, there is provided a method of controlling a camera unit, comprising a storage control step of causing a shooting position of the camera unit and a plurality of correction images different in focal length from each other which are obtained by a plurality of times of shooting, respectively, at the shooting position of the camera unit to be stored in association with each other in a storage unit, a comparison step of comparing a shot image newly shot at the shooting position and the plurality of correction images, and a correction step of correcting a displacement of the camera unit with respect to the shooting position according to a result of comparison by the comparison unit.

In a third aspect of the present invention, there is provided a program for causing a computer to execute a method of controlling a camera unit, wherein the method comprises a storage control step of causing a shooting position of the camera unit and a plurality of correction images different in focal length from each other which are obtained by a plurality of times of shooting, respectively, at the shooting position of the camera unit to be stored in association with each other in a storage unit, a comparison step of comparing a shot image newly shot at the shooting position and the plurality of correction images, and a correction step of correcting a displacement of the camera unit with respect to the shooting position according to a result of comparison by the comparison unit.

The features and advantages of the invention will become more apparent from the following detailed description taken in conjunction with the accompanying drawings.

BRIEF DESCRIPTION OF THE DRAWINGS

FIG. 4A is a diagram of preset information, illustrating a case where two presets are set.

FIG. 4B is a diagram of preset information, illustrating a case where three presets are set.

FIG. 4C is a diagram of preset information, illustrating a case where four presets are set.

DETAILED DESCRIPTION OF THE EMBODIMENTS

The present invention will now be described in detail below with reference to the accompanying drawings showing an embodiment thereof.

Figure 1:
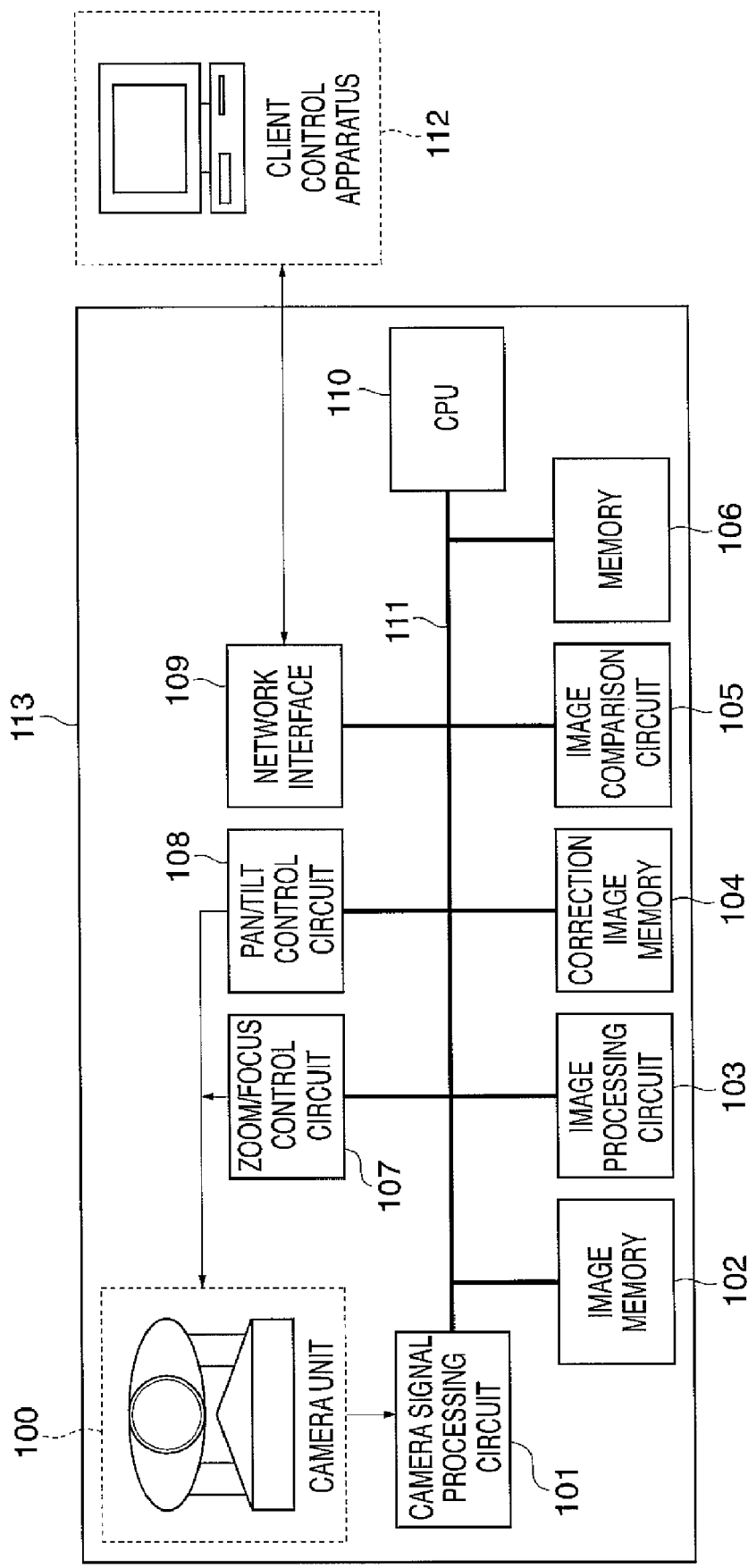
FIG. 1 is a block diagram showing the overall arrangement of an image pickup apparatus incorporating a control device for a camera unit according to an embodiment of the present invention.

FIG. 1 is a block diagram showing the overall arrangement of an image pickup apparatus incorporating a control device for a camera unit according to the embodiment of the present invention.

As shown in FIG. 1, a monitoring camera system as the image pickup apparatus is comprised of a monitoring camera 113, and a client control apparatus 112. The monitoring camera 113 can be controlled by the client control apparatus 112 connected to the monitoring camera 113 via a network.

The monitoring camera 113 includes a camera unit 100. The camera unit 100 is a mechanical part of the monitoring camera 113, including lenses, a CCD image pickup device, and motors that can drive a lens barrel in the pan direction or in the tilt direction. The camera unit 100 is used in a state fixedly mounted e.g. on a ceiling.

Further, the monitoring camera 113 incorporates a camera signal processing circuit 101, an image memory 102, an image processing circuit 103, a correction image memory 104, an image comparison circuit 105, and a memory 106. Furthermore, the monitoring camera 113 incorporates a zoom/focus control circuit 107, a pan/tilt control circuit 108, a network interface 109, and a CPU 110. The blocks in the monitoring camera 113 are interconnected via a bus 111.

The CPU 110 operates according to programs stored in the memory 106. When a command is issued from a program so as to transmit an image shot by the monitoring camera 113 to the client control apparatus 112 and store the image therein, the camera signal processing circuit 101 performs camera signal processing on an electric signal received from the CCD image pickup device of the camera unit 100. The electric signal is amplified to an optimal level by the camera signal processing, and is then converted into a video signal or an image signal.

An image obtained by the camera signal processing is temporarily stored in the image memory 102 and is then converted into JPG as a predetermined image format by the image processing circuit 103. The image converted into JPG is transferred to the client control apparatus 112 via the network interface 109 to be stored therein.

Further, when a zoom driving command or a pan/tilt driving command is issued from the client control apparatus 112 to the monitoring camera 113, a program in the memory 106 receives the command via the network interface 109. The CPU 110 issues a driving command to the zoom/focus control circuit 107 and/or the pan/tilt control circuit 108 to thereby change the orientation of the camera unit 100 and/or the zoom or magnification of the same.

The image comparison circuit 105 compares between the characteristic components of a past image stored in the correction image memory 104 and those of a present image obtained from the camera signal processing circuit 101, to thereby detect the amount of displacement between the two image, and converts the detected displacement amount into a pan/tilt control value.

Next, a description will be given of an outline of a presetting operation of the present monitoring camera.

A user designates a preset number by operating the client control apparatus 112, to thereby select a preset configuration mode. The user determines an angle of view of the monitoring camera 113 by operating the pan/tilt function and the zoom function while viewing an image shot by the monitoring camera 113, and then issues a preset setting command from the client control apparatus 112 to the monitoring camera 113.

The monitoring camera 113 receives the preset setting command via the network interface 109. Then, pan/tilt angle information, zoom information, and a shot image obtained at the time of reception of the preset setting command (at the presetting time) are stored as preset information in the memory 106 in association with the preset number.

Next, a correction image-storing process for storing a correction image in the correction image memory 104 at the presetting time will be described with reference to a flowchart shown in FIG. 2.

Figure 2:
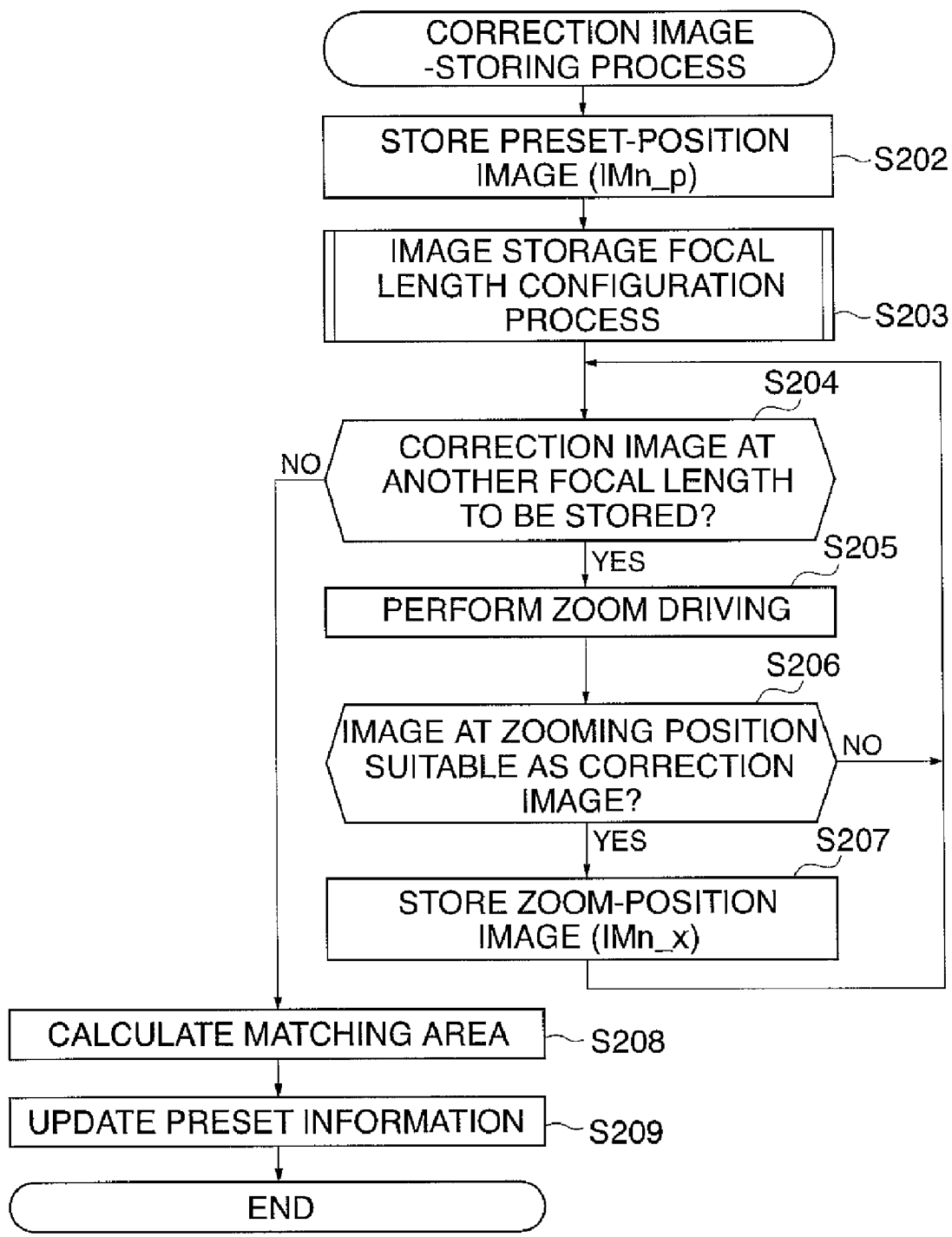
FIG. 2 is a flowchart of a correction image-storing process executed by a CPU appearing in FIG. 1.

FIG. 2 is a flowchart of the correction image-storing process executed by the CPU 110 appearing in FIG. 1.

Referring to FIG. 2, the user operates the client control apparatus 112 to start configuration of a preset. It is possible to store a plurality of presets in the memory 106, and hence a preset number is represented by Pn.

First, according to the very settings of a preset position, the CPU 110 stores an image shot at the preset position at the focal length selected at the presetting time, as a correction image IMn_p in the correction image memory 104 (step S202). The reference symbol IMn_p denotes a correction image shot at the preset position to which is assigned the preset number Pn.

Figure 3:
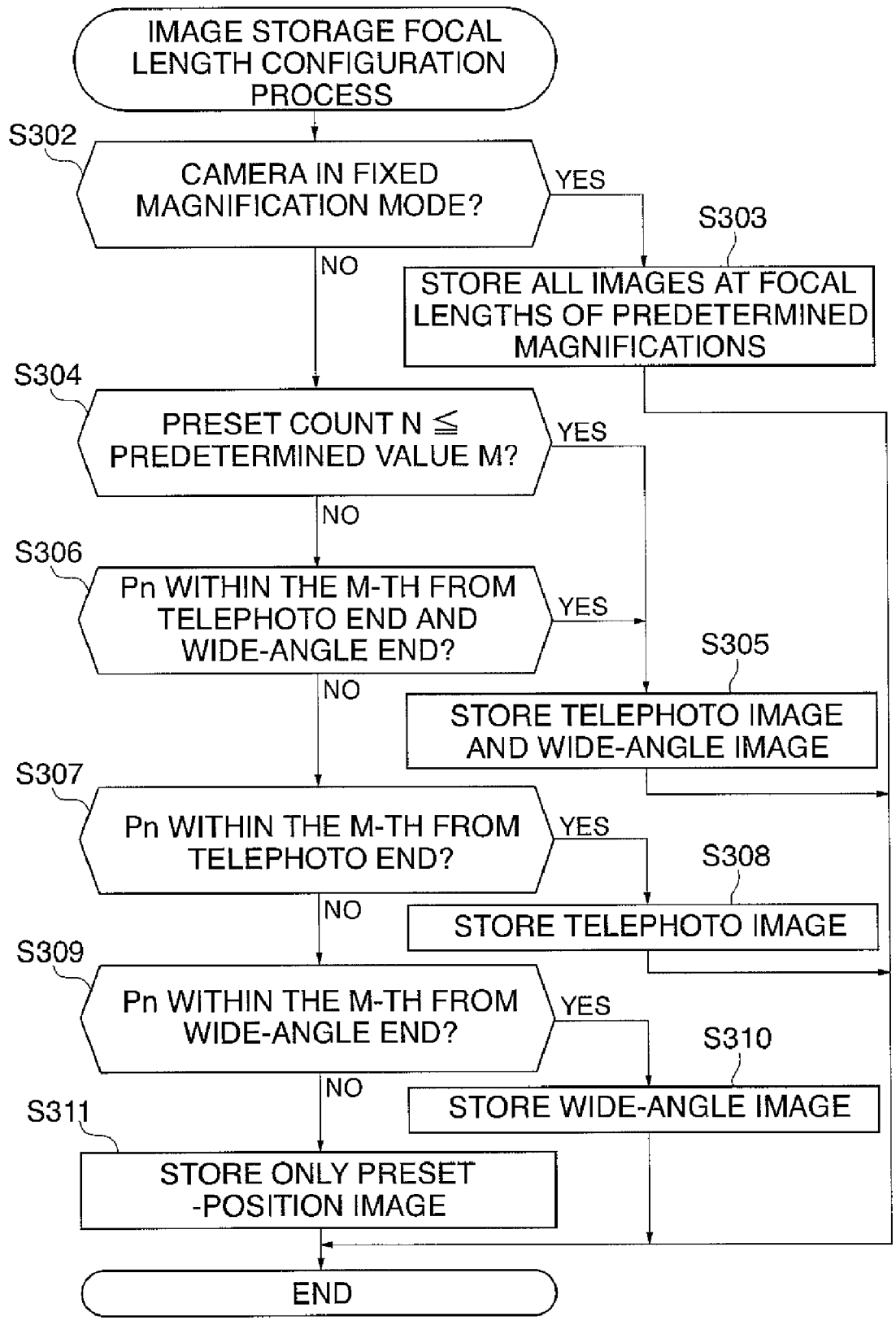
FIG. 3 is a flowchart of an image storage focal length configuration process executed in a step S203 in FIG. 2.

Next, an image storage focal length configuration process, which will be described hereinafter with reference to FIG. 3, is executed, and focal lengths other than the focal length selected at the presetting time are calculated (step S203). The focal lengths calculated in the step S203 while performing zoom driving by the zoom/focus control circuit 107 will be used in a latter step in the case of shooting correction images to be stored in the correction image memory 104.

Then, it is determined, based on the results calculated in the step S203, whether or not a correction image shot at another focal length than the focal length selected at the presetting time is to be stored in the correction image memory 104 (step S204).

If it is determined in the step S204 that a correction image shot at another focal length is to be stored in the correction image memory 104, the process proceeds to a step S205. In the step S205, the zoom driving is performed by the zoom/ focus control circuit 107 so as to obtain one of the focal lengths calculated in the step S203. Next, the CPU 110 determines whether or not an image shot at a position (zooming position) obtained by the zoom driving is suitable as a correction image (step S206).

If it is determined in the step S206 that the image shot at the zooming position is suitable as a correction image, the image IMn_x at the zooming position is stored as a correction image in the correction image memory 104 (step S207). It should be noted that a subscript n in the reference symbol IMn_x represents a preset number, and a subscript x is indicative of focal length information. If t is substituted for x, it is indicated that the image was shot at the telephoto end, while if w is substituted for x, the image was shot at the wide-angle end. Further, a numerical value substituted for x indicates a magnification.

After the correction image is stored in the correction image memory 104 in the step S207, or when it is determined in the step S206 that the image shot at the zooming position is not suitable as a correction image, the process returns to the step S204.

If it is determined in the step S204 that a correction image shot at another focal length is not to be stored in the correction image memory 104, i.e. if a correction image shot at another focal length is not necessitated, the process proceeds to a step S208. In the step S208, the CPU 110 calculates a matching area of the newly stored image IMn_x, for later use in image matching. In this step, the image is divided into five sections both vertically and horizontally to obtain 25 areas, and a low pass filter and a high pass filter are applied to luminance information on each area to thereby calculate edge components within the area. Then, it is determined whether or not the number of the edge components in each area is not smaller than a predetermined value, and an area having edge components of a larger number than the predetermined value and containing highest edge components is determined as the matching area.

Next, the preset information stored in an area of the memory 106 for management thereof is updated (step S209), followed by terminating the present process.

FIG. 3 is a flowchart of the image storage focal length configuration process executed in the step S203 in FIG. 2.

Referring to FIG. 3, the CPU 110 determines whether or not the monitoring camera 113 is in a fixed magnification mode, which is one of the two modes of the monitoring camera 113, i.e. the fixed magnification mode and a normal mode (step S302). If the monitoring camera 113 is in the fixed magnification mode, all correction images picked up at focal lengths corresponding to respective predetermined magnifications with respect to the image at the zooming position at the presetting time are set to be stored in the correction image memory 104 (step S303), followed by terminating the present process. For example, assuming that the zooming position at the presetting time has a magnification of 8, images picked up at respective zooming positions (focal lengths) having magnifications of 4, 12, 16, and 20, respectively, are set to be stored as correction images in the correction image memory 104.

If it is determined in the step S302 that the monitoring camera 113 is not in the fixed magnification mode, i.e. if the monitoring camera 113 is in the normal mode, the process proceeds to a step S304. In the step S304, the CPU 110 determines whether or not the preset count N indicative of the number of presets set so far is not larger than a predetermined count M that can be set by the user in a customized manner.

If it is determined in the step S304 that the preset count N is not larger than the predetermined count M, the process proceeds to a step S305. In the step S305, an image at the telephoto end (telephoto image) and an image at the wide-angle end (wide-angle image) are both set to be stored in the correction image memory 104, followed by terminating the present process.

If it is determined in the step S304 that the preset count N is larger than the predetermined count M, the process proceeds to a step S306. In the step S306, the CPU 110 compares a focal length Pn to be set this time with each of the focal lengths (Pn:n=0 to n−1) at each preset position, to thereby determine whether or not the focal length Pn is within the M-th both from the telephoto end and the wide-angle end. If the focal length Pn is within the M-th both from the telephoto end and the wide-angle end, the process proceeds to the step S305.

On the other hand, if it is determined in the step S306 that the focal length Pn is not within the M-th both from the telephoto end and the wide-angle end, the process proceeds to a step S307. In the step S307, the CPU 110 determines whether or not the focal length Pn is within the M-th from the telephoto end.

If it is determined in the step S307 that the focal length Pn is within the M-th from the telephoto end, only the telephoto image is set to be stored in the correction image memory 104 (step S308), followed by terminating the present process. If it is determined in the step S307 that the focal length Pn is not within the M-th from the telephoto end, the process proceeds to a step S309. In the step S309, it is determined whether or not the focal length Pn is within the M-th from the wide-angle end.

If it is determined in the step S309 that the focal length Pn is within the M-th from the wide-angle end, only the wide-angle image is set to be stored in the correction image memory 104 (step S310), followed by terminating the present process. If it is determined in the step S309 that the focal length Pn is not within the M-th preset position from the wide-angle end, only the image shot at the preset position is set to be stored in the correction image memory 104 (step S311), followed by terminating the present process.

Each image set to be picked up at the associated focal length is stored as a correction image in the correction image memory 104 in the process shown in FIG. 2.

FIGS. 4A, 4B, and 4C are diagrams of preset information stored in the memory 106 by the process in FIG. 2, in which FIG. 4A illustrates a case where two presets are set, FIG. 4B illustrates a case where three presets are set, and FIG. 4C illustrates a case where four presets are set.

In FIGS. 4A to 4C, it is assumed that the number of correction images (i.e. the predetermined count M in the step S304) is set to 2, and the pieces of the preset information are stored in the normal mode.

In FIG. 4A, each of a preset No. 1 and a preset No. 2 stores pan and tilt angle information, correction images, and matching area information associated with the correction images. Since the preset count N is smaller than the predetermined count M=2, and hence three images picked up at the wide-angle end, the telephoto end, and the preset position, respectively, are all registered. Letters p, w, and t set forth in boxes in the column of matching area are associated with a preset image (IMn_p), a wide-angle image (IM_w), and a telephoto image (IMn_t), respectively, and each argument represents an area in an image. For example, p(13) indicates that an area 13 in the image shot at the preset position is a matching area.

Referring to FIG. 4B, zoom information (magnification) in a preset No. 3 is ×8, which is the second both from the telephoto end and the wide-angle end when compared with the zoom information (magnification) in the other pieces of preset information, and hence three correction images shot at the wide-angle end, the telephoto end, and the preset position, respectively are stored in association with the preset No. 3. On the other hand, the information on the telephoto image in the preset No. 1, whose zoom information is the third from the telephoto end, is erased, and the information on the wide-angle image in the preset No. 2, whose zoom information is the third from the wide-angle end, is also erased.

Further, referring to FIG. 4C, zoom information (magnification) in a preset No. 4 is ×18, which is the fourth both from the wide-angle end when compared with the zoom information (magnification) in the other pieces of preset information, and hence two correction images shot at the telephoto end and the preset position, respectively, are stored in association with the preset No. 4. On the other hand, the information on the telephoto image in the preset No. 3, whose zoom information is the third from the telephoto end, is erased.

As described above, telephoto images of a number corresponding to the set value M=2 and wide-angle images of the same number are each stored as a correction image somewhere in all the presets in the preset information. In the monitoring camera 113 having the above described preset information, a patrol program for patrolling the preset positions is set by a user operation, for example, whereby the CPU 110 corrects a displacement of each preset position by causing the camera unit 100 to shift to the preset position.

Figure 5:
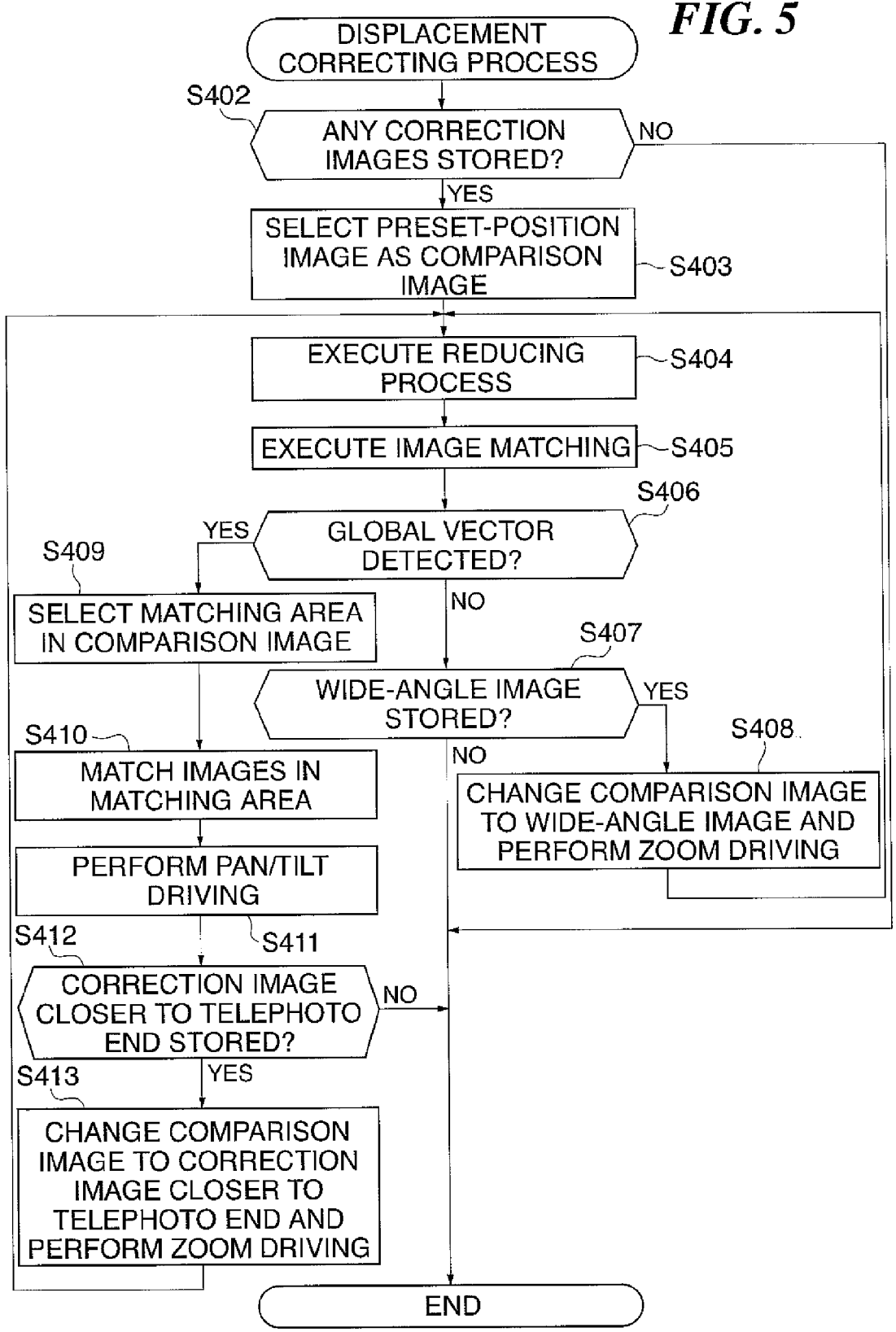
FIG. 5 is a flowchart of a displacement correcting process executed by the CPU appearing in FIG. 1.

FIG. 5 is a flowchart of a displacement correcting process executed by the CPU 110 appearing in FIG. 1.

In the displacement correcting process in FIG. 5, it is assumed that a user operation or timer program issues an instruction for causing the camera unit 100 to move to one of the preset positions registered in advance as described above, and pan/tilt driving and/or zoom driving are performed based on the preset information. Immediately thereafter, the CPU 110 determines whether or not there is any correction image shot at the preset position stored in the correction image memory 104 (step S402).

If it is determined in the step S402 that no correction image associated with the preset position is stored in the correction image memory 104, the present process is terminated. On the other hand, if it is determined in the step S402 that there is a correction image stored in association with the preset position in the correction image memory 104, the process proceeds to a step S403. In the step S403, the CPU 110 selects a preset-position image IMn_p as a comparison image for comparison with a current shot image (IM_T) obtained from the camera signal processing circuit 101.

Then, the image processing circuit 103 performs a reducing process on each of the two images for comparison, i.e. the preset-position image IMn_p and the current shot image (IM_T) (step S404).

Next, the image comparison circuit 105 performs image matching processing on these reduced images, and computes a match between the two images to thereby obtain a global vector corresponding to a pixel displacement between the two images (step S405).

Then, the CPU 110 determines whether or not the global vector is detected (step S406). If it is determined in the step S406 that no global vector is detected, there is little correlation between the reduced images, and therefore the process proceeds to a step S407.

In the step S407, the CPU 110 determines whether or not a wide-angle image (IMn_w) is stored as a correction image in the correction image memory 104 in association with the current preset position. If it is determined that the wide-angle image (IMn_w) is stored as a correction image in the correction image memory 104, the comparison image is changed to the wide-angle image, and at the same time the zoom driving of the camera unit 100 is performed up to the wide-angle end (step S408), followed by the process returning to the step S404. Then, the steps S404 et seq. are executed to compare the wide-angle images selected at the current preset position with each other.

If it is determined in the step S407 that no wide-angle image (IMn_w) is stored in the correction image memory 10 in association with the current preset position, the present process is terminated. Of course, in a case where too large an image displacement to be detected even at the wide-angle end has occurred, an operation for resetting pan/tilt positions may be forcibly performed.

If it is determined in the step S406 that the global vector is detected, the CPU 110 selects a matching area from the correction image for comparison (step S409). Then, the CPU 110 performs an image matching process for comparing between information on an image of the matching area and information on the current shot image (IM_T) (step S410). At this time, the CPU 110 performs the matching process while moving the image in a direction of the global vector detected in the step S406.

Figure 6A:
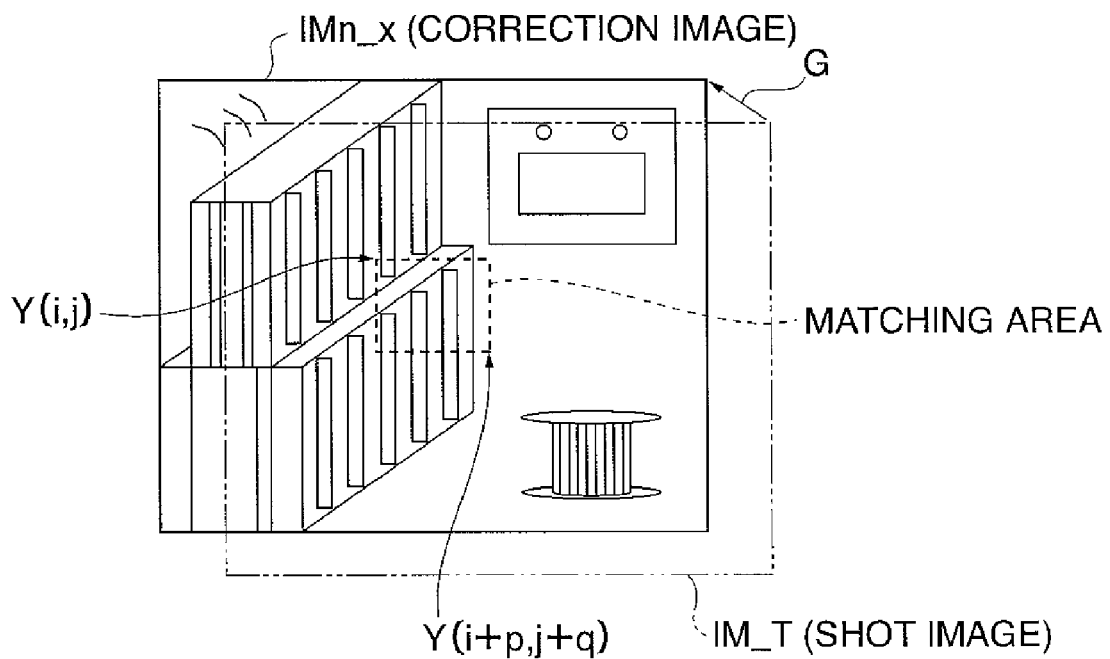
FIG. 6A is a view useful in explaining an image matching process executed in a step S410 in FIG. 5, illustrating a shot image and a correction image.
Figure 6B:
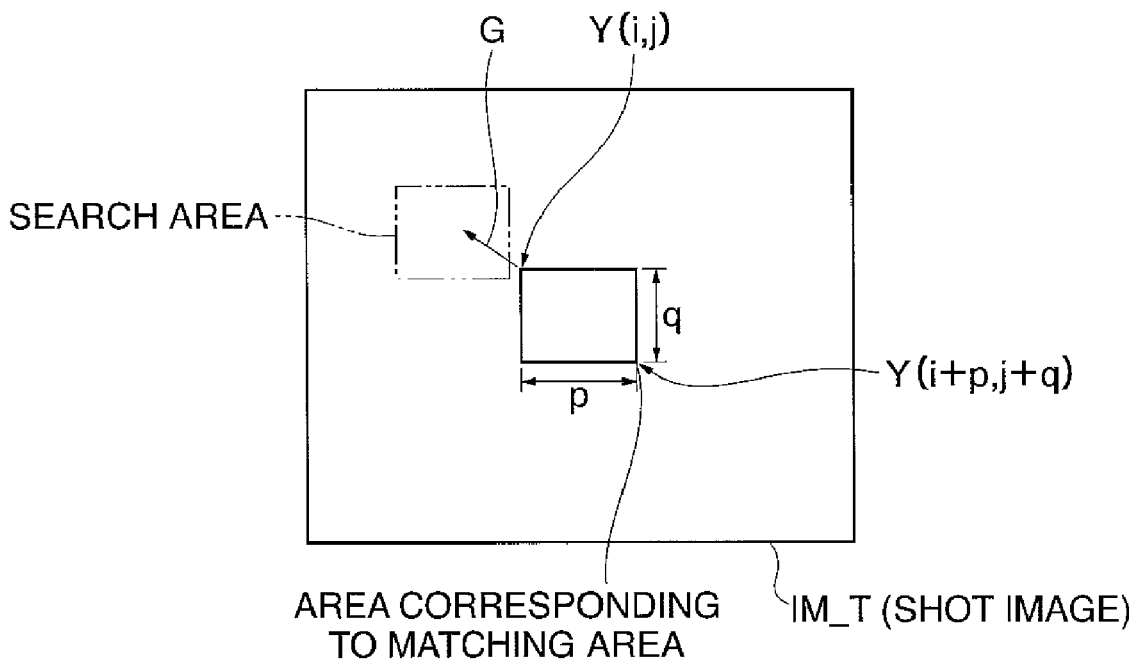
FIG. 6B is a view useful in explaining the image matching process executed in the step S410 in FIG. 5, illustrating the shot image.

FIGS. 6A and 6B are views useful in explaining the image matching process executed in the step S410 in FIG. 5, in which FIG. 6A illustrates both a shot image and a correction image, and FIG. 6B illustrates only the shot image.

Referring to FIG. 6A, a portion enclosed by solid lines represents the correction image IMn_x stored in the correction image memory 104 when the preset was registered. A portion enclosed by two-dot chain lines represents the shot image IM_T obtained from the camera signal processing circuit 101 when the camera unit 100 is zoomed to the preset position again. FIG. 6A shows a case where the preset position is displaced due to a loss of synchronism of the associated motor, a collision of the apparatus, an earthquake, or the like.

How the two-dot chain line portion and the solid line portion are displaced from each other has been roughly detected as a global vector G by the image matching performed on the reduced images in the step S405. Further, it is assumed that the matching area in the correction image IMn_x corresponds to an area enclosed by broken lines. This matching area is set by a rectangle having a pixel position (i, j) and a pixel position (i+p, j+p) at respective diagonally opposite corners thereof. Further, in the illustrated example, the luminance information of the pixel (i, j) is represented by Y (i, j).

FIG. 6B, in which the outer frame of the shot image IM_T is indicated by solid lines, shows the relationship between the global vector G, the matching area, and a search area for use in image matching. An area having a position obtained by adding a value corresponding to the global vector G to the pixel positions (i, j) and (i+p, j+p) of an area in the shot image IM_T corresponding to the matching area in the correction image, i.e. a position {(i, j)+G}, and a position {(i+p, j+p)+G} at respective diagonally opposite ends thereof is defined as the search area. The image comparison circuit 105 calculates the degree of correlation between the matching area and the search area in terms of luminance information and color information within the whole search area.

The degree of correlation between the matching area and the search area is obtained as the reciprocal of a value obtained by integrating the difference in the luminance information and color information between corresponding pixels over the whole area. More specifically, a correlation degree $\Sigma Y$ in luminance information between the matching area and the search area is expressed by the following equation (1):

$$1 / \sum Y = \sum_{i=0}^{p} \sum_{j=0}^{q} |Yt(i, j) - Y(i, j)| \quad (1)$$

Similarly, the degree of correlation between the matching area and the search area is calculated from color information as well. Assuming that the degree of correlation obtained from color information 1 is represented by $\Sigma C1$, and the degree of correlation obtained from color information 2 by $\Sigma C2$, the degree of correlation between the matching area and the search area is expressed by the following equation (2):

Correlation degree=$\Sigma Y \times \Sigma C1 \times \Sigma C2$ (2)

Figure 7A:
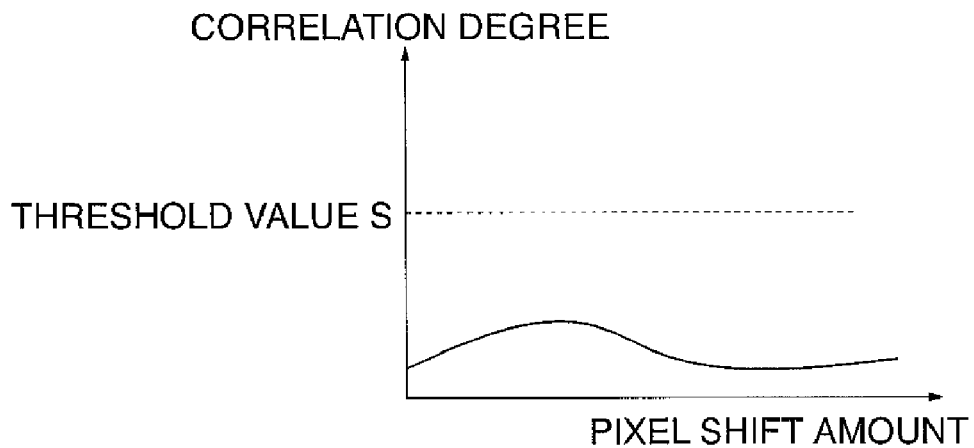
FIG. 7A is a diagram showing an example of the degree of correlation between a matching area and a search area, which is calculated in the image matching process described with reference to FIGS. 6A and 6B, illustrating a case where no peak position-indicating value is present.
Figure 7B:
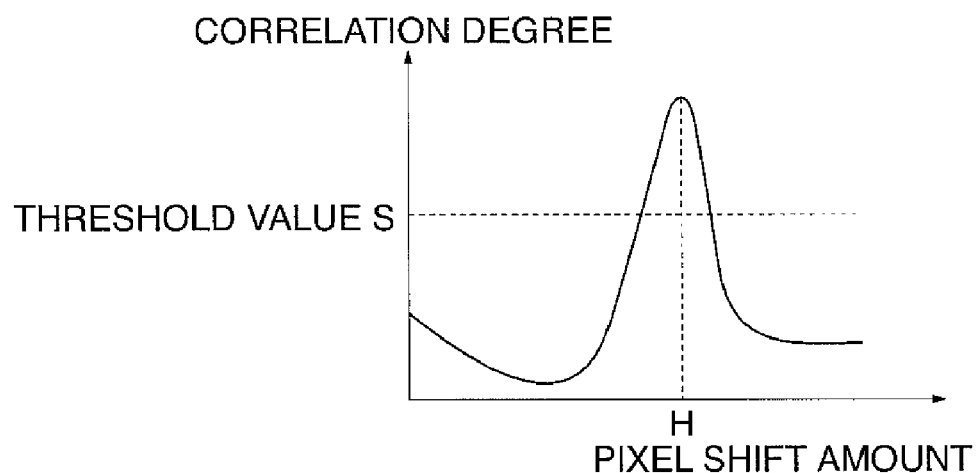
FIG. 7B is a diagram showing an example of the degree of correlation between the matching area and the search area, which is calculated in the image matching process described with reference to FIGS. 6A and 6B, illustrating a case where a peak position-indicating value is present.
Figure 7C:
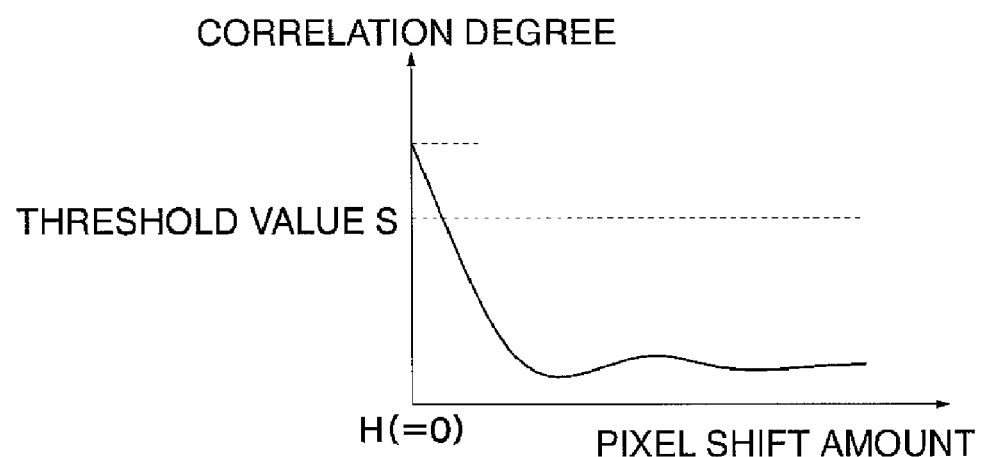
FIG. 7C is a diagram showing an example of the degree of correlation between the matching area and the search area, which is calculated in the image matching process described with reference to FIGS. 6A and 6B, illustrating a case where the peak position-indicating value is equal to 0.

FIGS. 7A to 7C are diagrams each showing an example of the degree of correlation between the matching area and the search area, which is calculated in the image matching process described with reference to FIGS. 6A and 6B, in which FIG. 7A shows a case where a peak position-indicating value H of the amount of pixel shift is not present, FIG. 7B shows a case where the peak position-indicating value H is present, and FIG. 7C shows a case where the peak position-indicating value H is equal to 0.

In each of FIGS. 7A to 7C, a horizontal axis represents the amount of pixel shift in the search area, and a vertical axis represents the degree of correlation between the matching area and the search area.

In the case of FIG. 7A, the degree of correlation between the matching area and the search area never exceeds a threshold value S with respect to any amount of pixel shift, and is held at a low level. This state does not occur in a case where the global vector is detected in the step S406 in FIG. 5. In detecting the global vector as well, the degree of correlation between the matching area and the search area is assessed by the same method, and if the correlation degree does not exceed the threshold value S, it is determined in the step S406 that no global vector has been detected.

In the case of FIG. 7B, assessment of the correlation degree is continued while performing pixel shift in the search area, and a peak position-indicating value H where the correlation degree exceeds the threshold value S is found. The amount of pixel shift at this time is calculated as the peak position-indicating value H.

In the case of FIG. 7C, the peak position-indicating value H is at a position where no shift is performed. This means that there is no pixel displacement between the matching area and the search area. In this case as well, it is determined in the step S406 that no global vector is detected.

Thus, an image displacement between the matching area and the search area is detected as an amount of pixel shift corresponding to the peak position-indicating value H. This amount of pixel shift is inversely calculated using a focal length into a pan/tilt driving amount.

Referring again to the flowchart in FIG. 5, in the step S410, the CPU 110 executes the image matching and then calculates the amount of pan/tilt driving. Next, based on the calculated driving amount, the CPU 110 performs pan/tilt driving using the pan/tilt control circuit 108 (step S411). Then, it is determined whether or not a correction image shot at a position closer to the telephoto end than the position where the correction image used for the present image matching was picked up is stored in the correction image memory 104 (step S412).

If it is determined in the step S412 that a correction image shot at a position closer to the telephoto end is not stored in the correction image memory 104, the present process is terminated. On the other hand, if a correction image shot at a position closer to the telephoto end is stored in the correction image memory 104, the comparison image is changed to the correction image shot at the position closer to the telephoto end, and the camera unit 100 is zoomed toward the telephoto end (step S413), followed by the process returning to the step S404.

With the sequence described above, when a preset position is displaced, a correction image and a shot image shot at a different focal length are compared with each other, whereby it is possible to correct the displacement of the preset position according to a displacement between the two images. Further, since correction images shot at respective different focal lengths are stored, it is possible to correct the displacement of a preset position by a small zoom driving amount.

According to the present invention, when registering preset information, correction images shot at a preset pan/tilt position after changing the focal length to a telephoto end and a wide-angle end are stored in the correction image memory 104. This makes it possible to perform fine adjustment of a displaced preset position using the telephoto end correction image and perform rough adjustment of a displaced preset position using the wide-angle end correction image. That is, it is possible to cope with both of a case where the camera unit 100 is displaced largely from a preset position and a case where the camera unit 100 is displaced slightly from the same, which makes it possible to enhance accuracy and reliability in displacement correction. Further, since only correction images each shot at an optimal focal length at each preset position are selected through comparison between a plurality of pieces of preset information and are stored in the correction image memory 104, it is possible not only to reduce a memory source for storing the correction images, but also to perform highly accurate correction.

It is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions This application claims priority from Japanese Patent Application No. 2007-177632 filed Jul. 5, 2007, which is hereby incorporated by reference herein in its entirety.

What is claimed is:

1. A control device connected to a camera unit, the control device comprising:
a storage control unit configured to cause a storage unit to store a plurality of images having a plurality of zooming positions shot by the camera unit at one of a plurality of shooting positions of the camera unit, and information of the one shooting position of the camera unit, in association with each other;
a comparison unit configured to compare one image, in one of the plurality of zooming positions, newly shot by the camera unit at the one shooting position with one of the stored images with the one zooming position, with respect to optical information, and compare another image, in another one of the plurality of zooming positions, newly shot by the camera unit at the one shooting position with another one of the stored images with the another one zooming position, with respect to optical information, to detect a degree of a displacement of the camera unit with respect to the one shooting position; and
a correction unit configured to compensate the displacement of the camera unit with respect to the shooting position if the displacement is detected,
wherein said correction unit selects the another one stored image in the another one zooming position according to the degree of the displacement of the camera unit with respect to the one shooting position.

2. A control device as claimed in claim 1, wherein said correction unit selects first yet another one of the stored images in a next one of the zooming positions with a higher zoom, when the degree of the displacement of the camera unit with respect to the one shooting position is small, and selects second yet another one of the stored images in the next one zooming position with a lower zoom, when the degree of the displacement of the camera unit with respect to the one shooting position is large.

3. A control device as claimed in claim 1, wherein said storage control unit changes the number of the stored images, according to the zooming positions.

4. A control device as claimed in claim 1, wherein said storage control unit causes the storage unit to store the plurality of images for each of the plurality of shooting positions of the camera unit.

5. A method of controlling a camera unit, the method comprising:

a storage control step of causing a storage unit to store a plurality of images having a plurality of zooming positions shot by the camera unit at one of a plurality of shooting positions of the camera unit, and information of the one shooting position of the camera unit, in association with each other;
a comparison step of comparing one image, in one of the plurality of zooming positions, newly shot by the camera unit at the one shooting position with one of the stored images with the one zooming position, with respect to optical information, and comparing another image, in another one of the plurality of zooming positions, newly shot by the camera unit at the one shooting position with another one of the stored images with the another one zooming position, with respect to optical information, to detect a degree of a displacement of the camera unit with respect to the one shooting position; and
a correction step of compensating the displacement of the camera unit with respect to the shooting position if the displacement is detected,
wherein said correction step selects the another one stored image in the another one zooming position according to the degree of the displacement of the camera unit with respect to the one shooting position.

6. A non-transitory computer-readable storage medium storing a program executable by a computer to execute a method of controlling a camera unit, the method comprising:
a storage control step of causing a storage unit to store a plurality of images having a plurality of zooming positions shot by the camera unit at one of a plurality of shooting positions of the camera unit, and information of the one shooting position of the camera unit, in association with each other;
a comparison step of comparing one image, in one of the plurality of zooming positions, newly shot by the camera unit at the one shooting position with one of the stored images with the one zooming position, with respect to optical information, and comparing another image, in another one of the plurality of zooming positions, newly shot by the camera unit at the one shooting position with another one of the stored images with the another one zooming position, with respect to optical information, to detect a degree of a displacement of the camera unit with respect to the one shooting position; and
a correction step of compensating the displacement of the camera unit with respect to the shooting position if the displacement is detected,
wherein said correction step selects the another one stored image in the another one zooming position according to the degree of the displacement of the camera unit with respect to the one shooting position.

7. A control device as claimed in claim 1, wherein the optical information comprises luminance information and color information.

* * * * *